(12) United States Patent
Covi et al.

(10) Patent No.: US 6,278,597 B1
(45) Date of Patent: Aug. 21, 2001

(54) CONDITIONAL OVER-VOLTAGE PROTECTION FOR REDUNDANT PHASE-SHIFT CONVERTERS

(75) Inventors: Kevin R. Covi, Glenford; Edward J. Seminaro, Milton; Steven Shevach, Hurley; Dale F. Sorenson, Ruby, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/412,538

(22) Filed: Oct. 5, 1999

(51) Int. Cl.⁷ .............................. H02H 7/00; H02H 3/20
(52) U.S. Cl. ........................... 361/91.1; 361/18; 323/271
(58) Field of Search .......................... 361/18, 88, 91.1, 361/78, 87; 307/64–66, 80, 86, 87; 323/234, 265, 271; 363/13, 74, 78

(56) References Cited

U.S. PATENT DOCUMENTS

| 4,553,197 | 11/1985 | Stemmler . | |
|---|---|---|---|
| 4,672,521 | 6/1987 | Riesco . | |
| 4,757,436 | 7/1988 | Ueda et al. . | |
| 5,122,726 | * 6/1992 | Elliott et al. | 323/272 |
| 5,471,376 | 11/1995 | Tsai et al. . | |
| 5,608,595 | 3/1997 | Gourab et al. . | |
| 5,808,453 | * 9/1998 | Lee et al. | 323/224 |
| 5,930,131 | * 7/1999 | Feng | 363/56 |
| 6,118,680 | * 9/2000 | Wallace et al. | 363/71 |
| 6,121,759 | * 9/2000 | Uusitalo | 323/272 |

\* cited by examiner

Primary Examiner—Kim Huynh
(74) Attorney, Agent, or Firm—Floyd Gonzalez; Cantor Colburn LLP

(57) ABSTRACT

An over-voltage protection circuit for power supplies employing phase-shift controllers is provided. The power supplies typically comprise a redundant system for maintaining availability of bus voltage in the event of the failure of one of the supplies. The circuitry provides advantages in high power applications over prior art by overcoming the inefficiencies of connecting the supplies to a common bus through a diode. Additional circuitry eliminates the false shutdown of working power supplies.

14 Claims, 4 Drawing Sheets

CONDITIONAL OVER-VOLTAGE PROTECTION FOR REDUNDANT PHASE-SHIFT CONVERTERS

BACKGROUND OF THE INVENTION

The present invention relates to over-voltage protection for power supplies. More specifically, the present invention relates to conditional over-voltage protection for redundant phase-shift converters.

A typical switching power supply has a switching stage, such as a pulse width modulator or phase-shift controller to regulate the output voltage of a power stage. Over-voltage protection is achieved by comparing the output voltage of the power stage to an internal over-voltage reference. When an over-voltage condition is detected, the switching is disabled which disables the power stage shutting down the output voltage.

In a redundant power system multiple power supplies are connected to a common bus to maintain availability of the bus voltage in the event of failure of one of the contributing supplies. An over-voltage condition of one power supply can raise the common bus voltage causing activation of the over-voltage protection of the other power supplies connected to the common bus.

In a low current redundant power system each power supply output is connected to the common bus through a diode, commonly referred to as an "OR-ing" diode. The "OR-ing" diode prevents each supply from sensing the over-voltage conditions of other supplies. An over-voltage bus reverse biases the diodes of the working supplies. Only the faulty supply is latched off by its over-voltage protection. Once the over-voltage condition is thus removed the remaining supplies resume normal operation.

In high current redundant systems it is not practical to use "OR-ing" diodes because of the severe loss of efficiency. All the supplies will sense an over-voltage fault in any supply and latch off causing unavailability of bus voltage.

SUMMARY OF THE INVENTION

Drawbacks and deficiencies of the prior art are overcome or alleviated by an over-voltage protection circuit for power supplies employing phase-shift controllers or the present invention. The power supplies typically comprise a redundant system for maintaining availability of bus voltage in the event of the failure of one of the supplies. The circuitry provides advantages in high power applications over prior art by overcoming the inefficiencies of connecting the supplies to a common bus through a diode. Additional circuitry eliminates the false shutdown of working power supplies. The present invention is embodied in circuitry that prevents the outputs of the phase-shift controller from switching when there is an over-voltage condition. The internal oscillator of the controller is halted whenever the error amplifier output goes low enough to drive the controller to 0% phase-shift.

The finite logic delays that cause unwanted sliver pulses are eliminated when there is no switching of the outputs of the phase-shift controller. Also, failure of one of the two switch drive circuits no longer causes an over-voltage condition. The phase-shift converter stops switching thus removing the energy source that caused the over-voltage condition.

BRIEF DESCRIPTION OF THE DRAWINGS

Referring now to the drawings wherein like elements are numbered alike in the several FIGURES.

DETAILED DESCRIPTION OF THE INVENTION

Figure 1:
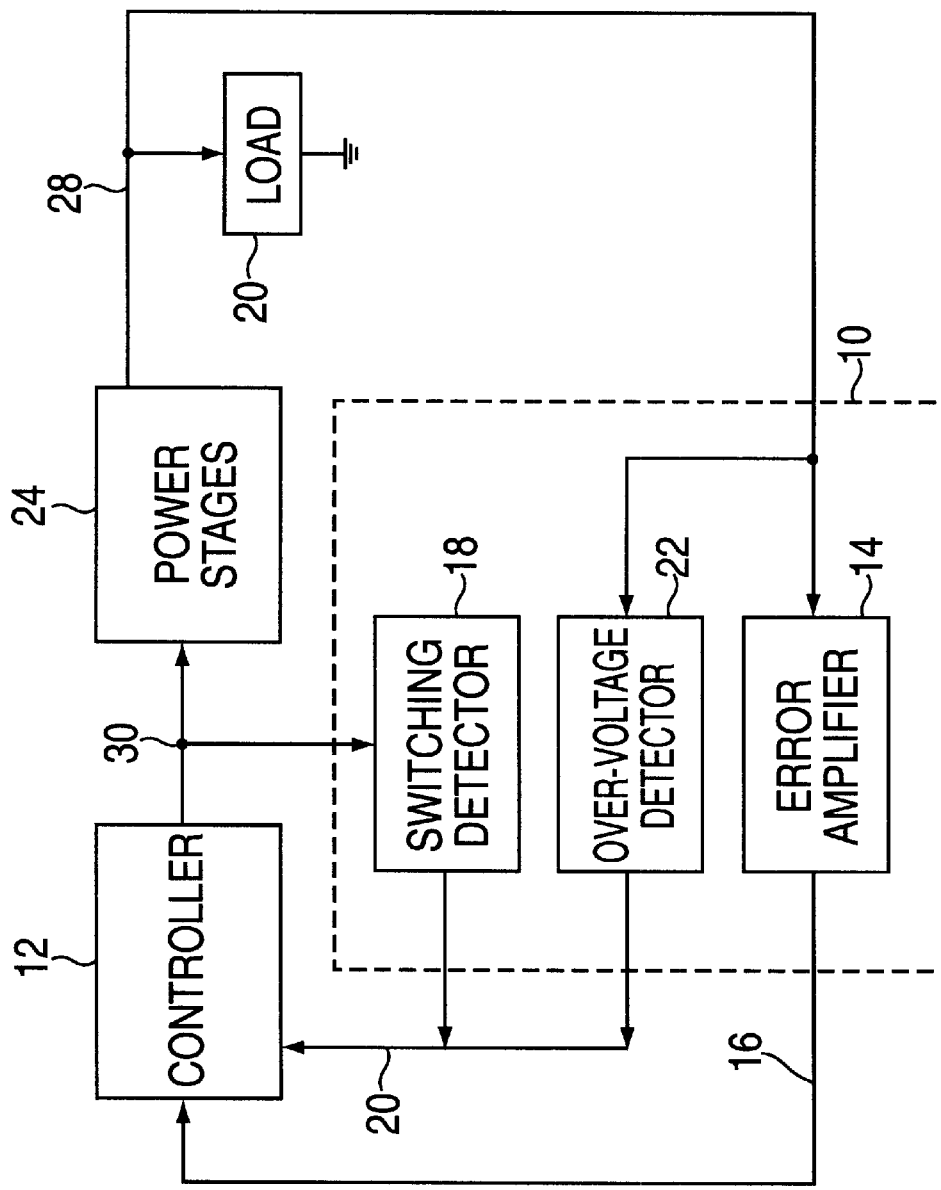
FIG. 1 is a block diagram of a conditional over-voltage protection circuit for a switching power supply in accordance with the prior art.

Referring to prior art FIG. 1, a block diagram of an over-voltage protection circuit is generally shown at 10. The over-voltage protection circuit comprises a controller 12 connected to an error amplifier 14 by a line 16, and connected to a switching detector 18 and an over-voltage detector 22 by a line 20. An output of the controller 12 on a line 30 drives a power stage 24 that provides an output voltage to a load 26 at a line 28. This output voltage is also provided to the error amplifier 14 to provide a correcting voltage for the controller 12 in response to fluctuations in the output voltage. In particular, the error amplifier 14 drives the controller 12 to shut off the output if the output voltage of the power stage 24 remains above a preset value. The output voltage on line 28 is also provided to the over-voltage detector 22 to detect when the output voltage exceeds a preset over-voltage reference voltage. The output of the controller 12 is also connected to the switching detector 18 to detect if the output of the controller 12 is switching.

A switching power supply is faulty if the outputs of the controller 12 continue switching and the output voltage exceeds the preset over-voltage reference. Therefore, the outputs of the over-voltage detector 22 and the switching detector 18 are connected so that the outputs of the controller 12 are latched off only when both conditions are met. This is known as "conditional over-voltage protection."

In a redundant power system all of the power stage outputs are connected to a common bus (not shown). A faulty supply raises the common bus voltage. The error amplifier 14 of the functioning power supplies will generate correcting voltages eventually turning off the outputs of the controller 12 in an attempt to lower the output voltage on the bus. The switching detector 18 detects when the outputs of the controller 12 are not switching. Conditional over-voltage protection of the functioning supplies prevents shut down of the controller 12 when the over-voltage detector 22 detects the over-voltage bus voltage because both conditions are not met. In the faulty supply the controller 12 does not respond to the error amplifier 14 correcting voltages and the outputs continue switching. The over-voltage protection circuit shuts down the outputs of the controller 12 of the faulty power supply. This clears the over-voltage condition on the common bus and the functioning supplies return to normal operation.

The power stage 46 generates the output voltage to a load 48. Switching output A at line 34 controls the state of MOSFET switches 50 and 52 and is connected thereto by a line 54. The complementary switching output B at line 36 controls and is connected to MOSFET switches 56 and 58 by a line 60. When output A turns on switches 50 and 52, current flows from a positive side of a voltage source 62 through switch 50 and a primary of a transformer 64. The drain of switch 50 is connected to the voltage source 62 by a line 74 and the source of switch 50 is connected to the primary of transformer 64 by a line 66. The current returns to the negative side of the voltage source 62 through switch 52. The drain of switch 52 is connected to the primary of transformer 64 by a line 70 and the source of switch 52 is connected to the negative side of voltage source 62 by a line 68. When the switching outputs A and B reverse, switches 50 and 52 turn off and switches 56 and 58 turn on. Current flows in the opposite direction in the primary of transformer 64. Current now flows from the positive side of the voltage source 62 through switch 56 and the primary of transformer 64. The drain of switch 56 is connected to the voltage source 62 by the line 74 and the source of switch 56 is connected to the primary of transformer 64 by line 70. The current returns to the negative side of the voltage source 62 through switch 58. The drain of switch 58 is connected to the primary of transformer 64 by line 66 and the source of switch 58 is connected to the negative side of voltage source 62 by a line 72. A free-wheel diode 76 is connected in parallel to the switch 50 with the anode of diode 76 connected by a line 88 to the source of switch 50 and the cathode of diode 76 connected by a line 90 to the drain of switch 50. In a similar manner, free-wheel diodes 78, 80, and 82 are connected in parallel to switches 58, 56, and 52, respectively. The free-wheel diodes 76, 78, 80, and 82 serve to prevent breakdown of the switches due to reverse flow of current when current reverses direction in the primary of transformer 64.

The switching of current in the primary of transformer 64 induces a voltage in the center-tapped secondary of transformer 64. Diodes 92 and 94 form a full-wave bridge rectifier. The anode of diode 92 is connected to one side of the secondary of transformer 64 and the anode to diode 94 is connected to the other side of the secondary of transformer 64. The cathode of diode 92 is connected to the cathode of diode 94 by a line 100. Line 100 is also connected to an inductor 102. The inductor 102 is connected in series with a capacitor 110 by a line 108. The capacitor 110 is connected to the center-tap secondary of transformer 64 by a line 104. The inductor 102 and capacitor 110 form a low-pass filter. The load is connected in parallel with capacitor 110 by lines 108 and 104. Output voltage is voltage across the load 48.

Output voltage regulation is achieved by comparing the output voltage to a reference voltage and generating a correcting drive for the controller 32. This is accomplished by an error amplifier 130. The output voltage of the power stage is connected by a line 132 to a resistor 134 and which is connected to an inverting input of an operational amplifier 138 by a line 136. The non-inverting input of operational amplifier 138 is connected to a reference voltage by a line 140. A feedback capacitor 142 is connected from the inverting input of operational amplifier 138 to the output of operational amplifier 138 by lines 136 and 144, respectively. This creates an integrating amplifier that generates an error correcting voltage on the line 144 proportional to variations of the output voltage of the power stage 46 compared to the reference voltage. Those skilled in the art can determine values for the resistor 134 and the capacitor 142. The error correcting output voltage is connected to the control input of controller 32 by line 144. The controller 32 alters the duty cycle of the switching outputs to correct for fluctuations in the output voltage of power stage 46. If the output voltage of power stage 46 remains above the reference voltage, a properly functioning controller 32 shortens the duty cycle until the switching outputs are completely shut down.

Conditional over-voltage protection is achieved by applying the output voltage of power stage 46 to an over-voltage detector 160 and the switching outputs A and B of controller 32 to a switching detector 182. In the over-voltage detector 160, the output voltage of power stage 46 is applied to a non-inverting input of a comparator 168 by a line 162. The inverting input of comparator 168 is connected to a predetermined over-voltage reference by a line 164. The normally low open-collector output of comparator 168 is connected to a pull-up resistor 172 by a line 170. The other side of resistor 172 is connected to a logic high voltage by a line 174. Line 170 also connects the output of comparator 168 to a latch circuit 176 and to an anode of a blocking diode 178. The output of the latch circuit 176 is connected to the shutdown input of controller 32 by a line 180. If the latch circuit 176 is triggered, the switching outputs A and B of controller 32 are shut off. This latches off the output voltage of power stage 46.

In the switching detector 182, the switching outputs A and B of the controller 32 are each connected to an input of a logic OR gate 190 by lines 184 and 186, respectively. During normal operation the switching outputs of controller 32 cause the output of OR gate 190 to be high. The output of the OR gate 190 is connected to the input of an edge-triggered one-shot (or retriggerable monostable) multivibrator 194 by a line 192. The pulse duration of the one-shot multivibrator 194 is set greater than the switching period of the switching outputs of controller 32 so that the one-shot multivibrator 194 output remains high during normal operation. The output of one-shot multivibrator 194 is also connected to the cathode of blocking diode 178 by a line 196. As stated above, during normal operation the output of the comparator 168 is held low. Therefore, during normal operation the latch circuit 176 is not triggered and the controller 32 is not shut down.

When an over-voltage fault is externally induced by a faulty supply connected to the common bus, the error amplifier 130 generates a signal to the controller 32 to decrease the duty-cycle of the switching outputs of the controller 32 to correct the fault on the common bus. Since the over-voltage is externally induced, the common bus remains over-voltage. The error amplifier 130 continues generating a signal to the controller 32 to decrease the duty-cycle of the switching outputs of controller 32 until the switching outputs are shut off. This drives the output of OR gate 190 low. The one-shot multivibrator 194 is triggered and the output of one-shot multivibrator 194 goes low. This in turn holds the input of latch circuit 176 low and prevents triggering of the latch circuit 176 and shutting down the controller when comparator 168 goes high in response to the over-voltage common bus.

In a faulty power supply the controller 32 is not responding to the output of the operational amplifier 138 and continues switching. The one-shot multivibrator 194 is not triggered and its output remains high. The output of the comparator 168 goes high in response to the over-voltage bus. This triggers the latch circuit 176 that shuts down the controller 32 of the faulty power supply. Once the faulty supply is latched off, the common bus voltage drops and the functioning supplies return to their normal operation.

It is clear that in pulse width modulator control circuits, the switching outputs of the controller turn off whenever the voltage regulation network detects that the output voltage is greater than the internal voltage reference. However, this is not the case in a ZVS- (zero-voltage-switched) FB- (full-bridge) pulse width modulator converter topology. In a ZVS-FB-PWM converter the switches are always switching. Pulse width modulator control is accomplished by varying the phase-shift between two 50% duty-cycle pulse trains, one for each half of the full-wave bridge. This version of conditional over-voltage protection circuit uses an exclusive-OR gate to determine if the pulse trains are switching. The prior art of FIG. 3 shows this arrangement, which is identical to FIG. 2 with the exception of an exclusive-OR gate 362 of FIG. 3 replacing the OR gate 190 of FIG. 2 and the addition of drive circuits 250 and 252 necessary to drive the power stage 200 MOSFET switch.

The operation of the conditional over-voltage protection circuitry of the phase-shift controller switching power supply is very similar to that of the pulse width modulator described above. Referring to prior art, in FIG. 3, the implementation of the conditional over-voltage protection to a phase-shift controller controlled switching power supply is shown. The phase-shift controller 202 generates two 50% duty-cycle pulse train pairs. One pair is represented as A and its complement, B, at lines 204 and 206, respectively. The other pair is represented as C and its complement, D, at lines 208 and 210, respectively. A capacitor 212 controlling the frequency of these switching outputs is connected by a line 214 to an oscillator input of the controller 202 and by a line 216 to a ground 218. These switching outputs are connected to, and control, a power stage 200.

The power stage 200 generates the output voltage to a load 256. Switching output A at line 204 controls the state of a MOSFET switch 220 and is connected thereto by a line 224 after enhancement of drive capability by a drive 250. The switching output D at line 210 controls and is connected to a MOSFET switch 222 by a line 232 after enhancement of drive capability by a drive 252. When outputs A and D turn on switches 220 and 222, respectively, current flows from a positive side of a voltage source 236 through switch 220 and a primary of a transformer 242. The drain of switch 220 is connected to the voltage source 236 by a line 238 and the source of switch 220 is connected to the primary of transformer 242 by a line 240. The current returns to the negative side of the voltage source 236 through switch 222. The drain of switch 222 is connected to the primary of transformer 242 by a line 244 and the source of switch 222 is connected to the negative side of the voltage source 236 by a line 246. When the switching outputs A and D reverse, switches 220 and 222 turn off and MOSFET switches 226 and 228 turn on. Switching output C at line 208 controls the state of MOSFET switch 226 and is connected thereto by a line 234 after enhancement of drive capability by drive 252. The complementary switching output B at line 206 controls and is connected to MOSFET switch 228 by a line 230 after enhancement of drive capability by drive 250. Current now flows in the opposite direction in the primary of transformer 242 from the positive side of the voltage source 236 through switch 226. The drain of switch 226 is connected to the voltage source 236 by the line 238 and the source of switch 226 is connected to the primary of transformer 242 by a line 244. The current returns to the negative side of voltage source 236 through switch 228. The drain of switch 228 is connected to the primary of transformer 242 by line 240 and the source is connected to the negative side of the voltage source by a line 248. A free-wheel diode 258 is connected in parallel to the switch 220 with the anode of diode 258 connected by a line 268 to the source of switch 220 and the cathode of diode 258 connected by a line 270 to the drain of switch 220. In a similar manner, free-wheel diodes 260, 262, and 264 are connected in parallel to switches 228, 226, and 222, respectively. The free-wheel diodes 258, 260, 262, and 264 serve to prevent breakdown of switches due to reverse flow of current when current reverses direction in the primary of transformer 242.

The switching of current in the primary of transformer 242 induces a voltage in the center-tapped secondary of transformer 242. Diodes 272 and 274 form a full-wave bridge rectifier. The anode of diode 272 is connected to one side of the secondary of transformer 242 and the anode to diode 274 is connected to the other side of the secondary of transformer 242. The cathode of diode 272 is connected to the cathode of diode 274 by a line 280. Line 280 is also connected to an inductor 282. The inductor 282 is connected in series with a capacitor 286 by a line 284. The capacitor 286 is connected to the center-tap secondary of transformer 242. The inductor 282 and capacitor 286 form a low-pass filter. The load is connected in parallel with capacitor 286 by lines 284 and 288. Output voltage is voltage across the load 256.

Output voltage regulation is achieved by comparing the output voltage to a reference voltage and generating a correcting drive for the controller 202. This is accomplished by an error amplifier 300. The output voltage of the power stage is connected by a line 302 to a resistor 304 and the resistor 304 is connected to an inverting input of an operational amplifier 312 by a line 306. The non-inverting input of operational amplifier 312 is connected to a reference voltage by a line 308. A feedback capacitor 310 is connected from the inverting input of operational amplifier 312 to the output of operational amplifier 312 by lines 306 and 314, respectively. This creates an integrating amplifier that generates an error correcting voltage on the line 314 proportional to variations of the output voltage of the power stage 200 compared to the reference voltage. Those skilled in the art can determine values for the resistor 304 and the capacitor 310. The error correcting output voltage is connected to the control input of controller 202 by line 314. The controller 202 alters the phase difference between the switching output pairs to correct for fluctuations in the output voltage of power stage 200. If the output voltage of power stage 200 remains above the reference voltage, the error correcting output voltage on line 314 drops low enough so that a properly functioning controller 202 decreases the phase difference until the switching outputs are in phase. That is, there is a 0% phase-shift.

Conditional over-voltage protection is achieved by applying the output voltage of power stage 200 to an over-voltage detector 320 and the switching outputs A and C of controller 202 to a switching detector 360. The output voltage of power stage 200 is applied to a non-inverting input of a comparator 328 by a line 322. The inverting input of comparator 328 is connected to a predetermined over-voltage reference by a line 324. The normally low open-collector output of comparator 328 is connected to a pull-up resistor 332 by a line 330. The other side of resistor 332 is connected to a logic high voltage by a line 334. Line 330 also connects the output of comparator 328 to a latch circuit 336 and to an anode of a blocking diode 338. The output of the latch circuit 336 is connected to the shutdown input of controller 202 by a line 340. If the latch circuit 336 is triggered, the switching outputs of controller 202 are shut off. This latches off the output voltage of power stage 200.

The switching outputs A and C of the controller 202 are each connected to an input of a logic exclusive-OR gate 362 by lines 364 and 366, respectively. The controller 202 is always switching. Therefore, the output of exclusive-OR gate 362 is high for some part of the cycle whenever the phase-shift is greater than 0%. The output of the exclusive-OR gate 362 is connected to the input of an edge-triggered one-shot (or retriggerable monostable) multivibrator 368 by a line 370. The pulse duration of the one-shot multivibrator 368 is set greater than the switching period of the switching outputs of controller 202 so that the output of one-shot multivibrator 368 remains high during normal operation. The output of one-shot multivibrator 368 is also connected to the cathode of blocking diode 338 by a line 370. As stated above, during normal operation the output of the comparator 328 is held low. Therefore, during normal operation the latch circuit 336 is not triggered and the controller 202 is not shut down.

When an over-voltage fault is externally induced by a faulty supply connected to the common bus, the error amplifier 300 generates a signal to the controller 202 to decrease the phase-shift between the switching output pairs of controller 202 to correct the fault on the common bus. Since the over-voltage is externally induced, the common bus remains over-voltage. The error amplifier 300 continues generating a signal to the controller 202 to decrease the phase-shift of the switching outputs of the controller 202 until there is 0% phase-shift. This drives the output of exclusive-OR gate 362 low. The one-shot multivibrator 368 is triggered and the output of one-shot multivibrator 368 goes low. This in turn holds the input of latch circuit 336 low and prevents triggering of the latch circuit 336 and shutting down the controller when comparator 328 goes high in response to the over-voltage common bus.

In the faulty power supply the controller 202 is not responding to the error amplifier 300 and the phase-shift is greater than 0%. The one-shot multivibrator 368 is not triggered and its output remains high. The output of the comparator goes high in response to the over-voltage bus. This triggers the latch 336 that shuts down the controller 202 of the faulty power supply. Once the faulty supply is latched off, the common bus voltage drops and the functioning supplies return to their normal operation.

Two problems were found with the phase-shift controller version of conditional over-voltage protection. First, finite logic delays often result in sliver pulses at the output of the exclusive-OR gate. These pulses are misinterpreted by the conditional over-voltage circuit as a phase-shift of greater than 0% between the pulse train outputs of controller. This results in shutdown of functioning controllers for an over-voltage.

A second failure mode is unique to the phase-shift control method where the faulty controller does not latch off. When one of the two switch drive circuits fails, energy transfer still occurs even though two of the four power switches are not being driven. The slow recovery of the internal body diode inherent to the MOSFET power switches result in the power transformer seeing volt-time even though only one side is being switched. The transfer of power is uncontrolled since the phase-shifting principle cannot work unless all four switches are active. The common bus voltage will go over-voltage if the load is light enough. The error amplifier 300 detects the over-voltage condition and goes low. This programs the phase-shift controller to go to 0% phase-shift resulting in the one-shot multivibrator 368 going low. This prevents setting of the latch circuit and shutdown of the controller when the output of the comparator 328 goes high. The result is that the over-voltage fault is not cleared on the faulty supply. All power supplies must be turned off since there is no way to determine which power supply has failed.

Figure 4:
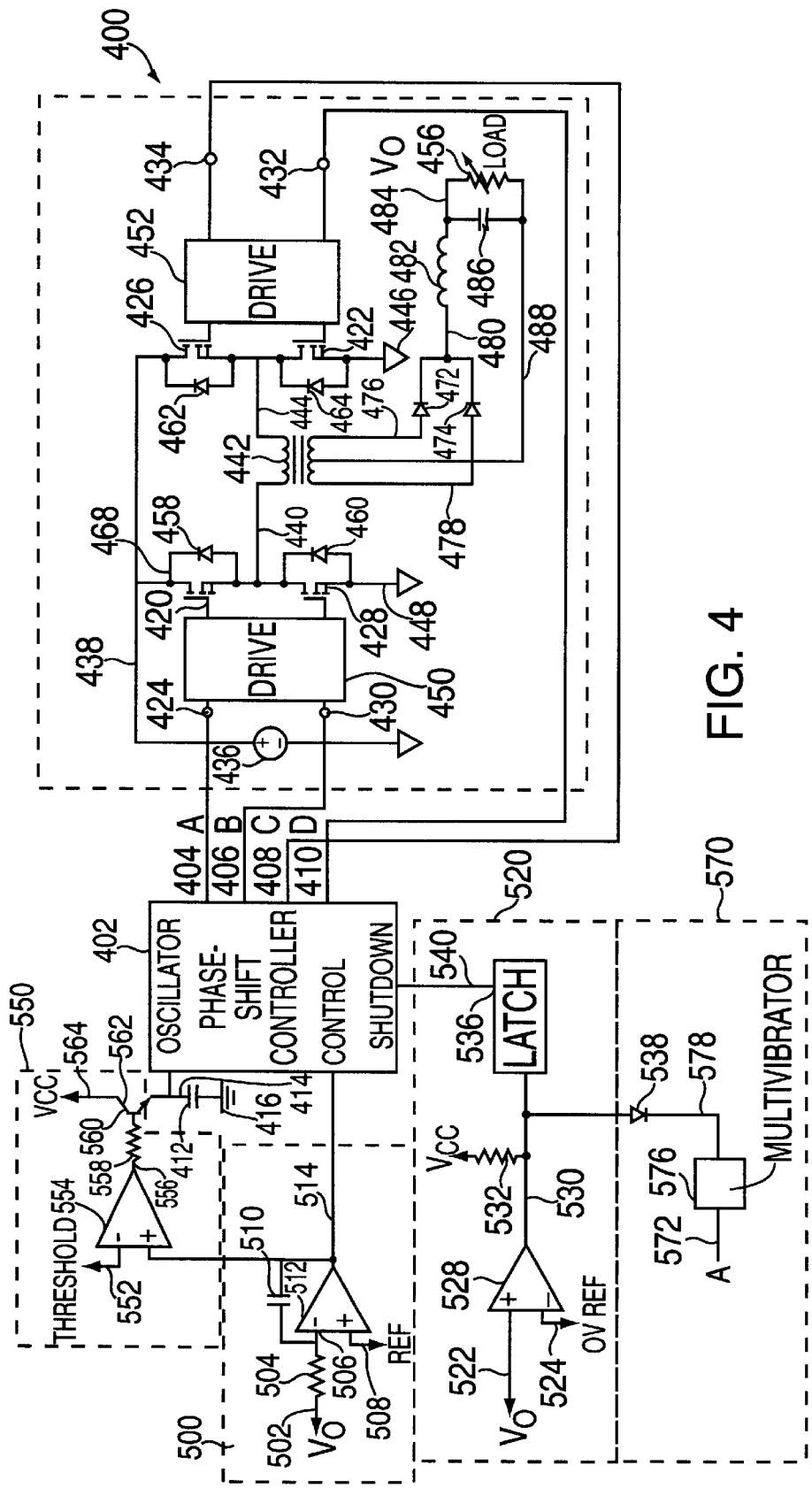
FIG. 4 is a schematic diagram of a ZVS-FB-PWM converter power supply having an over-voltage protection circuit in accordance with the present invention.

Referring now to FIG. 4, a conditional over-voltage protection circuit with a phase-shift controller controlled switching power supply in accordance with the present invention is generally shown. A phase-shift controller 402 generates two 50% duty-cycle pulse train signals pairs. One pair is represented as A and its complement, B, at lines 404 and 406, respectively. The other pair is represented as C and its complement, D, at lines 408 and 410, respectively. An oscillator capacitor 412 controlling the frequency of these pulse train signals is connected by a line 414 to an oscillator input of the controller 402 and by a line 416 to a ground 418. These pulse train signals are connected to, and control, a power stage 400.

The power stage 400 generates the output voltage to a load 456. Pulse train signal A at line 404 controls the state of a MOSFET switch 420 and is connected thereto by a line 424 after enhancement of drive capability by a drive 450. The pulse train signal D at line 410 controls and is connected to a MOSFET switch 422 by a line 432 after enhancement of drive capability by a drive 452. When outputs A and D turn on switches 420 and 422, respectively, current flows from a positive side of a voltage source 436 through switch 420 and a primary of a transformer 442. The drain of switch 420 is connected to the voltage source 436 by a line 438 and the source of switch 420 is connected to the primary of transformer 442 by a line 440. The current returns to the negative side of voltage source 436 through switch 422. The drain of switch 422 is connected to the primary of transformer 442 by a line 444 and the source of switch 422 is connected to the negative side of voltage source 436 by a line 446. When the pulse train signals A and D reverse, switches 420 and 422 turn off and MOSFET switches 426 and 428 turn on. Pulse train signal C at line 408 controls the state of MOSFET switch 426 and is connected thereto by a line 434 after enhancement of drive capability by drive 452. The complementary pulse train signal B at line 406 controls and is connected to MOSFET switch 428 by a line 430 after enhancement of drive capability by drive 450. Current now flows in the opposite direction in the primary of transformer 442 from the positive side of the voltage source 436 through switch 426. The drain of switch 426 is connected to the voltage source 436 by the line 438 and the source of switch 426 is connected to the primary of transformer 442 by a line 444. The current returns to the negative side of voltage source 436 through switch 428. The drain of switch 428 is connected to the primary of transformer 442 by line 440 and the source is connected to the negative side of the voltage source by a line 448. A free-wheel diode 458 is connected in parallel to the switch 420 with the anode of diode 458 connected by a line 468 to the source of switch 420 and the cathode of diode 458 connected by a line 470 to the drain of switch 420. In a similar manner, free-wheel diodes 460, 462, and 464 are connected in parallel to switches 428, 426, and 422, respectively. The free-wheel diodes 458, 460, 462, and 464 serve to prevent breakdown of switches due to reverse flow of current when current reverses direction in the primary of transformer 442.

The switching of current in the primary of transformer 442 induces a voltage in the center-tapped secondary of transformer 442. Diodes 472 and 474 form a full-wave bridge rectifier. The anode of diode 472 is connected to one side of the secondary of transformer 442 and the anode to diode 474 is connected to the other side of the secondary of transformer 442. The cathode of diode 472 is connected to the cathode of diode 474 by a line 480. Line 480 is also connected to an inductor 482. The inductor 482 is connected in series with a capacitor 486 by a line 484. The capacitor 486 is connected to the center-tap secondary of transformer 442. The inductor 482 and capacitor 486 form a low-pass filter. The load is connected in parallel with capacitor 486 by lines 484 and 488. Output voltage is voltage across the load 456.

Output voltage regulation is achieved by comparing the output voltage to a reference voltage and generating a correcting drive for the controller 402. This is accomplished by an error amplifier 500. The output voltage of the power stage is connected by a line 502 to a resistor 504 and the resistor 504 is connected to an inverting input of an operational amplifier comparator 512 by a line 506. The non-inverting input of operational amplifier 512 is connected to a first reference voltage signal by a line 508. A feedback capacitor 510 is connected from the inverting input of operational amplifier 512 to the output of operational amplifier 512 by lines 506 and 514, respectively. This creates an integrating amplifier that generates an error correcting voltage (control signal) on the line 514 proportional to variations of the output voltage of the power stage 400 compared to the first reference voltage signal. Those skilled in the art can determine values for the resistor 504 and the capacitor 510. The error correcting output voltage is connected to the control input of controller 402 by line 514. The controller 402 alters the phase difference between the pulse train signal pairs to correct for fluctuations in the output voltage of power stage 400. If the output voltage of power stage 400 remains above the reference voltage, the error correcting output voltage on line 514 drops low enough so that a properly functioning controller 402 decreases the phase difference until the pulse train signals are in phase. That is, there is a 0% phase-shift.

Controller 402 switching is halted when the error correcting voltage on line 514 drops below a threshold value necessary to drive the controller 402 to force a 0% phase-shift. This is accomplished by an oscillator suppressor comparator 550. The error correcting voltage on line 514 is connected to a non-inverting input of a comparator 554. The inverting input of comparator 554 is connected to a predetermined threshold voltage (reference voltage ) by a line 552. The output of comparator 554 (zero oscillator signal) is connected by a line 556 to a resistor 558 that is connected to a base of a switching transistor 562. The emitter of switching transistor 562 is connected by a line 564 to logic voltage high. The collector of switching transistor 562 is connected by line 414 to the oscillator capacitor 412 and the oscillator input of controller 402. The output of comparator 554 is high during normal operation. This turns off switching transistor 563, which allows the oscillator of controller 402 to stay on. The predetermined threshold voltage is selected as lower than the voltage at which the controller 402 forces a 0% phase-shift but high enough so that the comparator 554 does not turn on the switching transistor 562 during steady-state operation under any load condition.

When an over-voltage fault is externally induced by a faulty supply connected to the common bus, the error amplifier 500 generates a signal to the controller 402 to decrease the phase-shift between the pulse train signal pairs of controller 402 to correct the fault on the common bus. Since the over-voltage is externally induced, the common bus remains over-voltage. The error amplifier 500 generates a voltage below the threshold to drive the pulse train signals of controller 402 to 0% phase-shift. The output of comparator 554 goes low when the error correcting voltage on line 514 drops below the threshold voltage on line 552. The low output of the comparator 554 turns on switching transistor 562. This puts a logic high voltage on the oscillator input of controller 402 and stops the oscillator and, therefore, the switching of the outputs of controller 402.

Conditional over-voltage protection is achieved by applying the output voltage of power stage 400 to an over-voltage detector comparator 520 and one pulse train signal of controller 402 to a switching detector 560. The output voltage of power stage 400 is applied to a non-inverting input of a comparator 528 by a line 522. The inverting input of comparator 528 is connected to a predetermined over-voltage reference (third voltage reference signal) by a line 524. The normally low open-collector output of comparator 528 is connected to a pull-up resistor 532 by a line 530. The other side of resistor 532 is connected to a logic high voltage by a line 534. Line 530 also connects the output of comparator 528 (shutdown signal) to a latch 536 and to an anode of a blocking diode 538. The output of the latch 536 is connected to the shutdown input of controller 402 by a line 540. If the latch 536 is triggered, the pulse train signals of controller 402 are shut off. This latches off the output voltage of power stage 400.

A switch detector 570 determines if the outputs of the controller 402 are switching. In an over-voltage fault, oscillator controller 550 stops the output switching of controller 402, as described above. Only one output of controller 402 is needed to determine whether a controller is still switching. Output A of controller 402 on line 404 was selected arbitrarily. Output A is connected to an input of an edge-triggered one-shot (or retriggerable monostable multivibrator) 576 (multivibrator by a line 572. The pulse duration of the one-shot multivibrator 576 is set greater than the switching period of the pulse train signals of controller 402 so that the output of one-shot multivibrator 576 remains high during normal operation. The output of the one-shot multivibrator 576 is also connected to the cathode of blocking diode 538 by a line 578. As stated above, during normal operation the output of the comparator 528 is held low. Therefore, during normal operation the latch 536 is not triggered and the controller 402 is not shut down.

As described above, an externally induced over-voltage fault halts the pulse train signals of phase-shift controller 402. The one-shot multivibrator 576 is triggered and the output of the one-shot multivibrator 368 goes low. This in turn holds the input of the latch 536 low and prevents triggering of the latch 536 and shutting down the controller when comparator 528 goes high in response to the over-voltage common bus.

Since the outputs of the controller 402 are not switching there is no possibility of unwanted sliver pulses triggering the latch 536. Since all switching is halted, spurious sliver pulses can never retrigger the one-shot multivibrator 576. Further, failure of one of the two switch drive circuits cannot cause an over-voltage condition. When the bus voltage rises high enough to cause the control voltage to drop below the threshold the controller will stop switching. This removes the energy source that was causing the over-voltage condition.

While a preferred embodiment has been shown and described, various modifications and substitutions may be made thereto without departing from the spirit and scope of the invention. Accordingly, it is to be understood that the present invention has been described by way of illustration and not limitation.

We claim:

1. An over-voltage protection circuit for a switching power supply, said over-voltage protection circuit comprising:

a first comparator having first and second inputs, said first input of said first comparator receptive to an output voltage signal from the switching power supply, said second input of said first comparator connected to a first reference voltage signal, said first comparator having an output for providing a control signal indicative of a difference between said signals at said first and second inputs of said first comparator, a second comparator having first and second inputs said first input of said second comparator connected to said output of said first comparator to receive said control signal, said second input of said second comparator connected to a second reference voltage signal, said second comparator having an output for providing a zero oscillator signal indicative of a difference between said signals at said first and second inputs of said second comparator;

an oscillator capacitor; and a controller having a control input connected to said output of said first comparator to receive said control signal, said controller having an oscillator input connected to said capacitor, said controller having a plurality of outputs for connection to inputs of the switching power supply, each of said outputs of said controller providing a pulse train signal, said capacitor defining a frequency of said pulse train signals, said control signal defining a phase-shift between said pulse train signals, said oscillator input of said controller connected to said output of said second comparator, wherein said zero oscillator signal drives the frequency of said pulse train signals to zero.

2. The over-voltage protection circuit of claim 1 further comprising:

a switching transistor connected between said output of said second comparator and said oscillator input of said controller, said switching transistor having a base connected to said output of said second comparator and a collector connected to said oscillator input of said controller.

3. The over-voltage protection circuit of claim 1 further comprising: a resistor connected in series to said first input of said first comparator; and a feedback capacitor connected between said first input of said first comparator and said output of said first comparator, thereby providing an integrated amplified said control signal.

4. The over-voltage protection circuit of claim 1 further comprising:

a third comparator having first and second inputs, said first input of said third comparator receptive to said output voltage signal from the switching power supply, said second input of said third comparator connected to a third reference voltage signal, said third comparator having an output for providing a shutdown signal indicative of a difference between said signals at said first and second inputs of said third comparator; and wherein said controller further includes a shutdown input connected to said output of said third comparator to receive said shutdown signal, wherein said shutdown signal shuts down said outputs of said controller.

5. The over-voltage protection circuit of claim 4 further comprising:

a latch connected between said output of said third comparator and said shutdown input of said controller, wherein said latch sets in response to said shutdown signal.

6. The over-voltage protection circuit of claim 5 further comprises:

a multivibrator connected to said latch for preventing setting of said latch.

7. The over-voltage protection circuit of claim 1 wherein said controller comprises a phase-shift controller.

8. An over-voltage protection circuit for a switching power supply, said over-voltage protection circuit comprising:

a first comparator having first and second inputs, said first input of said first comparator receptive to an output voltage signal from the switching power supply, said second input of said first comparator connected to a first reference voltage signal, said first comparator having an output for providing a shutdown signal indicative of a difference between said signals at said first and second inputs of said first comparator;

a second comparator having first and second inputs, said first input of said second comparator receptive to a signal derived from an output voltage signal from the switching power supply, said second input of said second comparator connected to a second reference voltage signal, said second comparator having an output for providing a zero oscillator signal indicative of a difference between said signals at said first and second inputs of said second comparator;

an oscillator capacitor; and a controller having a shutdown input connected to said output of said first comparator to receive said shutdown signal, said controller having an oscillator input connected to said capacitor, said controller having a plurality of outputs for connection to inputs of the switching power supply, each of said outputs of said controller providing a pulse train signal, said capacitor defining a frequency of said pulse train signals, said oscillator input of said controller connected to said output of said second comparator, wherein said zero oscillator signal drives the frequency of said pulse train signals to zero and wherein said shutdown signal shuts down said outputs of said controller.

9. The over-voltage protection circuit of claim 8 further comprising:

a switching transistor connected between said output of said second comparator and said oscillator input of said controller, said switching transistor having a base connected to said output of said second comparator and a collector connected to said oscillator input of said controller.

10. The over-voltage protection circuit of claim 8 further comprising:

a latch connected between said output of said first comparator and said shutdown input of said controller, wherein said latch sets in response to said shutdown signal.

11. The over-voltage protection circuit of claim 10 further comprises:

a multivibrator connected to said latch for preventing setting of said latch.

12. The over-voltage protection circuit of claim 8 wherein said controller comprises a phase-shift controller.

13. A method of over-voltage protection for a switching power supply, said method of over-voltage protection comprising:

comparing an output voltage signal from the switching power supply to a first reference voltage signal to provide a control signal indicative of a difference between said output voltage signal and said first reference voltage signal;

comparing said control signal to a second reference voltage signal to provide a zero oscillator signal indicative of a difference between said control signal and said second reference voltage signal;

defining a frequency of a plurality of pulse train signals;

defining a phase-shift between said pulse train signals in response to said control signal; and driving the frequency of said pulse train signals to zero in response to said zero oscillator signal.

14. The method of over-voltage protection of claim 13 further comprising:

comparing said output voltage signal from the switching power supply to a third reference voltage signal to provide a shutdown signal indicative of a difference between said output voltage signal and third reference voltage signal, and shutting down said pulse train signals in response to said shutdown signal.

* * * * *

UNITED STATES PATENT AND TRADEMARK OFFICE
CERTIFICATE OF CORRECTION

PATENT NO. : 6,278,597 B1
DATED : August 21, 2001
INVENTOR(S) : Covi et al.

Figure 2:
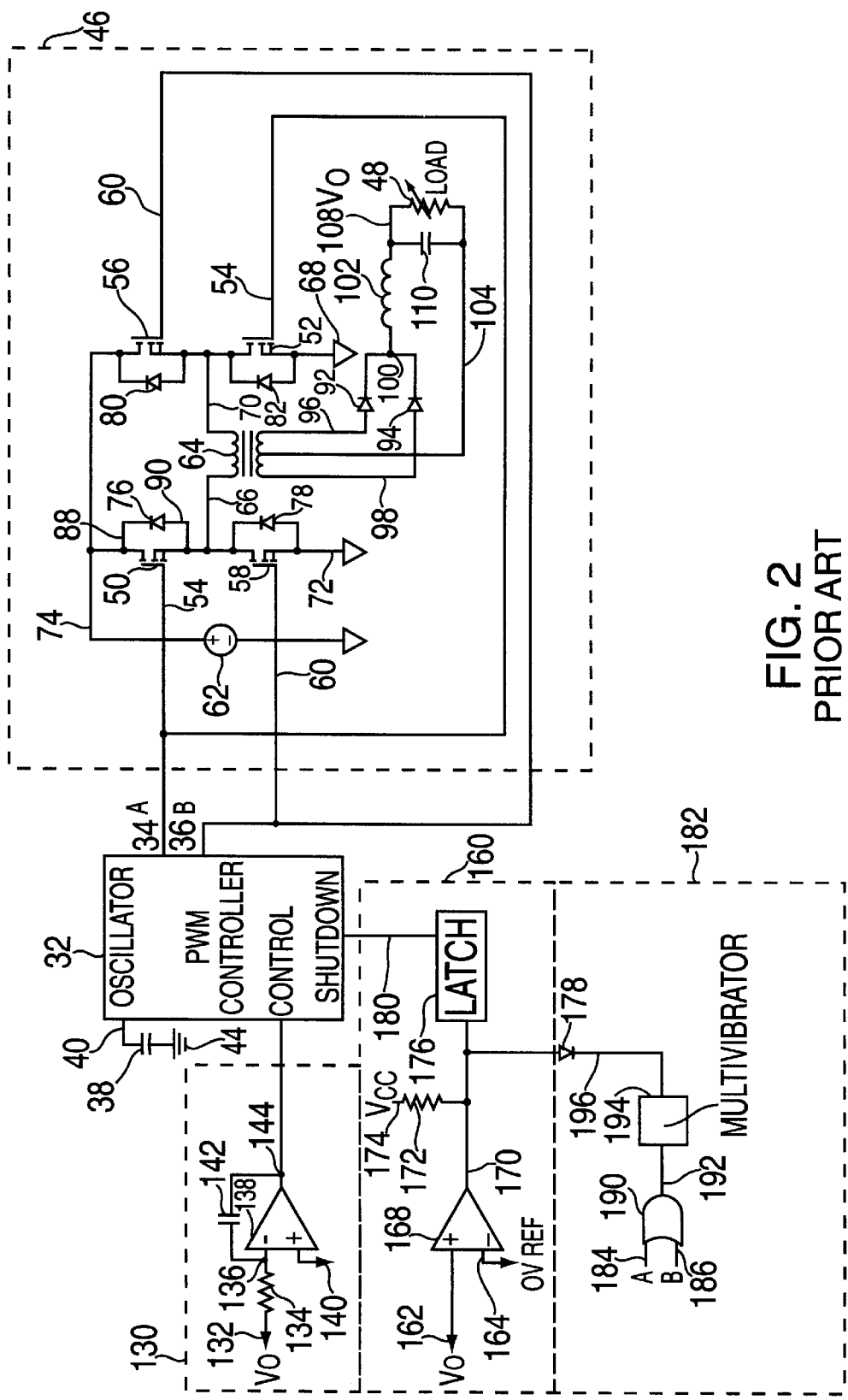
FIG. 2 is a simplified schematic diagram of a conditional over-voltage protection circuit for a pulse width modulator controlled switching power supply in accordance with the prior art.
Figure 3:
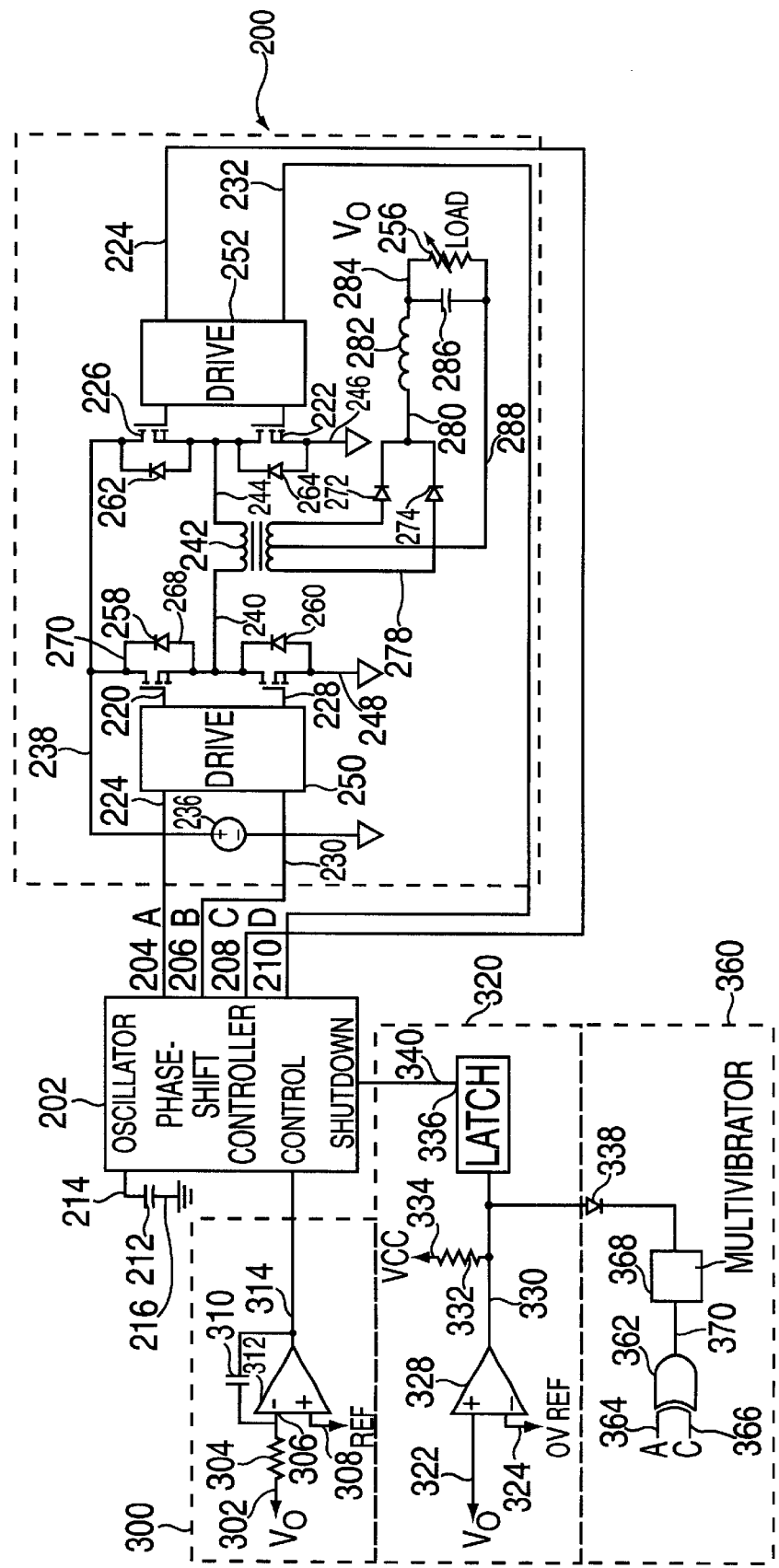
FIG. 3 is a simplified schematic diagram of a conditional over-voltage protection circuit for a ZVS-FB-PWM converter power supply in accordance with the prior art.

It is certified that error appears in the above-identified patent and that said Letters Patent is hereby corrected as shown below:

Column 2,
Line 61, before "The" insert -- Referring to prior art FIG 2, a conditional over-voltage protection for a pulse width modulator controlled switching power supply is shown. A pulse width modulator controller 32 generates complementary switching outputs A and B at lines 34 and 36, respectively. A capacitor 38 controlling the frequency of these switching outputs is connected by a line 40 to an oscillator input of controller 32 and by a line 42 to a ground 44. These switching outputs are connected to, and control, a power stage 46. --

Column 9,
Line 67, after "detector" delete "comparator" and insert therefor -- (comparator) --

Signed and Sealed this

Nineteenth Day of April, 2005

JON W. DUDAS
*Director of the United States Patent and Trademark Office*